Figure 1:
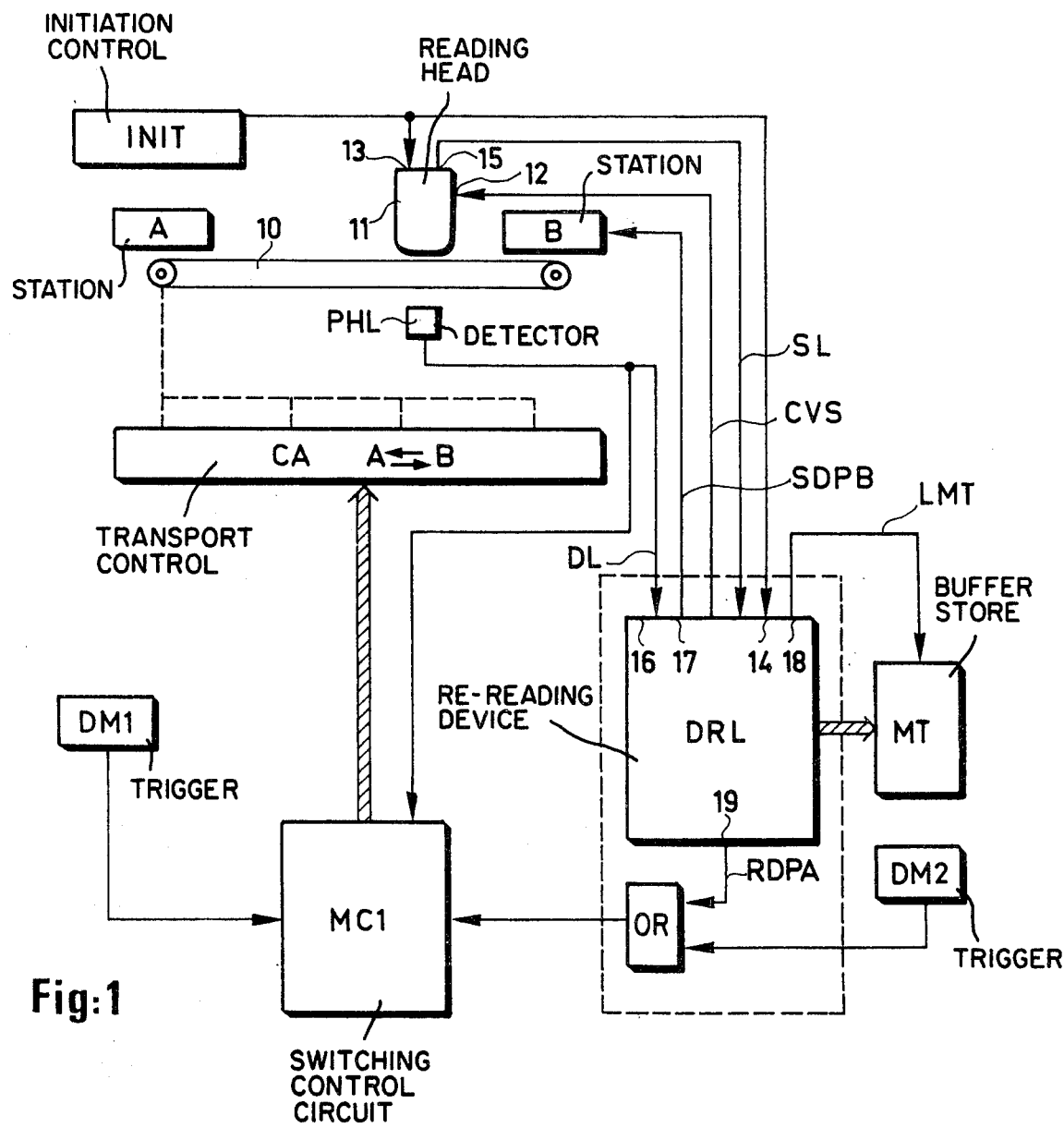

United States Patent [19]

Mercier

[11] 4,096,472

[45] Jun. 20, 1978

[54] SYSTEMS FOR RECOGNIZING PRINTED CHARACTERS

[75] Inventor: Denis Louis Mercier, St. Georges, France

[73] Assignee: Compagnie Internationale pour l'Informatique Cii-Honeywell Bull (Societe Anonyme), Paris, France

[21] Appl. No.: 790,803

[22] Filed: Apr. 25, 1977

[30] Foreign Application Priority Data

Apr. 26, 1976 France ................................ 76 12302

[51] Int. Cl.² ............................................. G06K 9/00
[52] U.S. Cl. ............... 340/146.3 ED; 340/146.3 AG; 340/146.3 AH
[58] Field of Search .......... 340/146.3 AG, 146.3 AH, 340/146.3 ED, 146.3 D, 146.3 Z

[56] References Cited

U.S. PATENT DOCUMENTS

| | | | |
|---|---|---|---|
| 3,263,216 | 7/1966 | Andrews ..................... | 340/146.3 ED |
| 3,641,495 | 2/1972 | Kiji ............................ | 340/146.3 ED |
| 3,715,724 | 2/1973 | Demonte et al. ......... | 340/146.3 AG |

Primary Examiner—Leo H. Boudreau
Attorney, Agent, or Firm—Cameron, Kerkam, Sutton, Stowell & Stowell

[57] ABSTRACT

A system for recognizing printed characters each composed of a predetermined number of vertical lines arranged in accordance with a given code wherein the characters are read serially as a result of the document being moved between an input station and an output station of a transport mechanism associated with a reading device. The reading device includes at least one amplitude discriminating circuit having various threshold levels applied to it. Means are provided for locating the point at which the reading of the document commences and for reading the document and generating a read signal during the whole period when the document is being read. A buffer store is connected to the reading means for temporarily storing read characters which are satisfactory for use. Repeat reading means are connected to means for reading the document and to the buffer store.

11 Claims, 5 Drawing Figures

FiG:2

SYSTEMS FOR RECOGNIZING PRINTED CHARACTERS

The present invention relates to improvements in systems for recognising printed characters. Known systems operate by scanning the characters to be recognised using reading means adapted to the particular type of character. From these reading means there is generally obtained coded information which can be used as a basis for recognition, this information being in a format which bears a direct relationship to the configuration of the characters concerned. The improvements which are the subject of this invention are applicable to any type of printed character which, when read by known recognition systems, gives coded information which can be handled by logic circuits, that is to say which can be binary coded. At the present time very wide-spread use is made of characters composed of vertical lines, and the invention is particularly applicable to the recognition of these characters. An arrangement for analysing characters of this kind is described in French Pat. No. 1,271,150 which was filed on July 26, 1960 by Compagnie des Machines Bull. This arrangement is particularly adapted for analysing figures printed in a magnetisible ink on a carrier which may be a bank cheque.

The lines which form each character to be analysed are separated by long and short intervals which are arranged according to a combinatory code. What is termed an interval is the distance between the leading (or trailing edges) of two adjacent lines. By arbitrarily assigning the value 1 to a long interval and the value 0 to a short interval and by using a so-called "two out of six" code, it is possible to establish a coding system embracing 15 combinations to cover the figures 0 to 9 and five special symbols which are used as registration symbols or signs for the beginning and end of words. Thus, the number of lines adopted is seven. This method of coded representation is extremely advantageous in that it will tolerate irregularities in the printed characters. It enables a relatively simple analysing system to be used, such as that which is described in French Pat. No. 1,271,150, as well as equally simple error-checking members. In the reading operation which is performed, only one specific edge (leading or trailing) of each line of a character in fact has any significance and irregularities resulting from the lines being of different thicknesses have no effect on the recognition of the long and short intervals, provided they do not lie outside a certain tolerance. On the other hand, should a plurality of adjacent lines be thick enough to merge together, the character would be read as containing, for example, one line fewer than the normal number of lines. A simple pulse counter contained in the arrangement described in French Pat. No. 1,271,150 allows an error signal to be generated in cases where only six lines are counted, for example, and this signal invalidates the transfer of the coded combination to a buffer store in the arrangement which is used for the temporary storage of the six code items belonging to each character to be identified. It may also happen that a fault of this nature results in a very long interval being detected in the course of the defective character; a very long interval being defined as that separating two successive characters on a document. In cases where a line is entirely lacking from a character, a very long interval is detected in the same way and, since the pulse counter does not count the seven lines which should normally be present, a no-error detecting device (which is connected to the pulse counter in the said arrangement) fails to generate a signal at its output. In cases where the number of long intervals detected in a character is odd, i.e. is 1 or 3, a detector in the said arrangement detects something other than the presence of two long intervals (which are used in so-called "two from six" coding) and this prevents a signal from being generated at the output of the no-error detector. With the same arrangement it is also possible to detect any incorrect intervals which lie, on the one hand, between the upper limit for a short interval and the lower limit for a long interval and, on the other hand, between the upper limit for a long interval and the lower limit for a very long interval.

In an addition no. 79378 to the main French Pat. No. 1,271,150, the intervals between lines forming characters are evaluated by time measuring devices which are formed by at least one time base and a plurality of amplitude discriminators. At least one of these discriminators is responsible for detecting the very long intervals between characters and another is responsible for detecting the long intervals contained in each of the characters. Means are also provided for detecting an interval shorter than a normal short interval, should one occur, which would mean an erroneous character. This may happen, for example, when the cheque being dealt with is lying askew, in which case the time base is stopped before a discriminator (or amplitude comparator) connected to it detects that the time limit corresponding to a short interval has been exceeded, and an error signal so generated prevents the coded combination from being transferred to the buffer store already mentioned. In this case the no-error detector described in the main patent becomes an AND gate which, when no error signal is generated under the conditions explained above, validates the transfer of each coded combination (from the characters to be identified) to the said buffer store. Thus, a permitted combination signal is generated at the output of the AND gate when the respective authorisation signals are present at its inputs.

Despite the advantages offered by the use of characters made up of lines spaced according to a given code, printing these lines may give rise to inking faults which result in erroneous identification as a consequence of read-out signals whose amplitude is too low for them to be used. In the case of magnetic characters, another cause of erroneous identification may be metallic inclusions, and particularly ferrous ones, in the paper of the cheque. Since a ferrous inclusion is magnetised in the same way as the characters before they are read, it is clear that during analysis a large inclusion, may, depending upon its position, either be taken for a line or mask an interval. As in a number of commonly used arrangements, an amplitude discriminator or an amplifier which has a clipping threshold may be incorporated in the reading circuit associated with the identification system. The threshold level may be adjusted in such a way that the device in question transmits to the recognition members only those signals whose amplitude appreciably exceeds the said threshold level. Given that inking faults and inclusions are the cause of errors which have contrary effects, it is necessary to adopt a compromise value for the threshold level applied to the amplitude discriminator.

With an arrangement such as that described in French Pat. No. 1,271,150, actual use shows that the percentage or rate of errors detected varies as a function of the threshold level adopted for the amplitude discriminator incorporated in the reading circuit. The number of cheques rejected because of metal inclusions increases if the threshold level is reduced, whilst the number of cheques rejected for inking deficiencies increases as the threshold level is increased. When a threshold level has been adopted which is the optimum for a batch of cheques of average standard, it is found that the numbers of errors detected is much higher than the number of genuinely defective cheques. By genuinely defective cheques are meant those which have one or more characters which would make them impossible to handle in a sorting or calculating machine.

Improvements to character identification systems described in French Pat. No. 1,295,497 enable a considerable reduction to be made in the number of needlessly rejected items whilst retaining the measure of security necessary to detect genuinely defective items. These improvements consist in coupling two recognition arrangements in parallel, which arrangements are fed with the read-out signals from one and the same reading transducer. The two arrangements, which may be similar to that described in the patents mentioned above, are absolutely identical except that the threshold levels which are applied to the amplitude discriminators incorporated in the arrangements are different. Each of the arrangements includes a temporary store and an error detector. Logic switching circuits enable the information identifying each character read to be transferred to a common buffer store from one or other of the two temporary stores, under the control of the error detectors. A first arrangement has a relatively low threshold level applied to it whilst a relatively high threshold level is applied to the second arrangement. In this way errors resulting from metal inclusions tend to predominate at the output of the first arrangement. Conversely, errors resulting from inking faults or the like tend to predominate at the output of the second arrangement. Co-operation between the arrangements is effected in such a way that if an error is only detected by the first arrangement the faulty character is nevertheless transferred from the other arrangement to the buffer store. It is only when the detection of an error is indicated simultaneously at the outputs of both arrangements that the information representing the erroneous character is prevented from being transferred. The improvements described in French Pat. No. 1,295,497 thus enable a reading error to be detected which is due, for example, to a spot which is situated in a short interval and is sufficiently large to cover the space between two lines. In this event the number of lines counted and/or the number of long intervals counted are in fact incorrect. It may also occur that the spot or inclusion is situated in a long interval close to a line, thus making the line equivalent to a thicker line. In this case the said interval may be interpreted as a short interval and the next interval, which is assumed to be of normal shortness, may be interpreted as a long interval. The resulting error is thus the displacement of a long interval and it will be seen that this error cannot be detected since neither the number of long intervals counted nor the number of lines read is incorrect. The improvements described in French Pat. No. 1,375,037 provide a device which is capable of detecting and indicating any error due to a fault of the kind indicated above, which it does by making an indirect check on the thickness of the lines so as to lessen still further the chances of faults remaining undetected and of characters being needlessly rejected. In addition to means which make interval measurements on the read-out signals originating from the trailing edges of the lines, these improvements consist in means which carry out similar interval measurements but on the read-out signals originating from the leading edges of the lines. A comparator constantly checks that the measurements from these two means are equal and it emits an error signal if it detects a difference exceeding a predetermined limit. The check which is made in this way cannot be too exacting without causing error signals to be emitted over frequently. In effect, the actual thickness of the printed lines is subject to variation, generally in the direction of excess. In this respect the indirect measurement process according to the invention mentioned previously is superior to the direct measurement process since it retains sufficient accuracy whilst allowing the thickness of the lines to vary within a wider tolerance. Any fault capable of causing an exaggerated change in the apparent or actual thickness of a line may give rise to a mistake in interpretation. Thus, error checking devices such as those mentioned above are incapable of detecting an error when only one long interval takes the place of a short interval and vice versa. As an example, a configuration which was wrong by a 1 and a 0, namely 100010, would be interpreted as representing the figure 1 rather than the figure 4 as printed on the cheque. By checking the apparent thickness of each of the lines in characters, it is thus possible to avoid any erroneous interpretation of characters which may suffer from the faults indicated above. The circuits described in French Pat. No. 1,375,037 will be infallible in detecting a fault affecting the leading edge of a line. An advantage of this is that characters can equally well be analysed when moving in the opposite direction without modifying the recognition arrangement.

Despite the various improvements made to systems for recognising magnetic characters, the few specific instances which are considered above show how difficult it is to provide systems which are capable of performing a reliable check on read characters and which do not reject characters with excessive frequency.

In particular the means contained in these improvements enable the number of lines to be checked for each character read, enable a check to be made on whether the same thing is recognised when the detection is of the transitions on the one hand at the leading edges of the lines and on the other hand at the trailing edges of the lines, and enable a check to be made on whether the character read is permissible, that is to say whether it contains the relative number of long and short intervals called for by the code which is adopted (for example "two long intervals for four short intervals"). The nature of these checks allows for the possible presence of metal inclusions and possible inking deficiencies in the lines. In particular, by virtue of its two identical arrangements, the improvement described in French Pat. No. 1,295,497 enables characters on a given document to be read simultaneously under two sets of conditions whereby inking faults in the one case and metal inclusions in the other case are shown up more clearly, which is done by adjusting the threshold levels applied to the amplitude discriminators incorporated in these arrangements to a relatively high level in one case and a relatively low level in the other.

In comparison with the other improvements which have been described, this latter improvement has the advantage that the same checks can be performed under stricter conditions.

Nevertheless, such simultaneous checks made with relative extremes of threshold level applied to the discriminators have disadvantages. They do not in fact always allow a "good" character to be recognised when, for example, the inking faults and the metal inclusions represent local defects which are negligible in comparison with the average level of inking of the lines of the character concerned. In this latter case, reading performed with an average threshold level (that is to say one whose standard value was decided as a function of the inking of a reference line) would result in the character being definitely recognised as satisfactory.

All these considerations demonstrate the necessity of taking into account all the possible variations in the standard of the printed characters, there being related to the quality of the support for the characters.

In order to reduce still further the number of unjustified rejects, one object of the present invention is to provide means which enable allowance to be made for a relative variation in inking deficiencies and in false over-inking due to the presence of metal inclusions in the support for the characters, in relation to a mean inking which is defined as being that of a reference line.

In accordance with the invention, improvements in systems for recognising printed characters which comprise:

- a reading device of which at least one amplitude discrimininator circuit may have various threshold levels applied to it;
- means connected to the reading device which are designed to generate, for each character read, items of binary coded information and an associated binary-coded error code obtained by checking the corresponding items of coded information,
- means for locating the point at which reading of the document begins, which are associated with the reading device and are designed to generate a read signal during the whole time the document is being read,
- a buffer store being connected to the said reading means to store temporarily those read characters which are satisfactory for use;
- characterised in that they consist in means for repeat reading which are connected to the means for reading the document and to the buffer store, which is thus connected to the reading means, the document being read for a first time with the threshold level adjusted to a first average level which is set to allow a reference character whose mean inking is known to be recognised, these reading repeat means being devised:
- to store one by one in a first memory zone the items of information and associated error codes resulting from the first reading operation,
- to check whether an examination of all the error codes stored in the first zone does not result in at least one character being recognised as being erroneous,
- to repeat the reading of the document with the threshold at different respective levels which are respectively ascending and descending on one or other side of the first value, and to store the items of information and error codes obtained from each reading operation in different memory zones as long as at least one erroneous character is detected in the course of a reading operation, the total number of reading operations with the threshold applied to the reading device at different levels not exceeding a given number N,
- to read out and transfer to the buffer store the content of a memory zone which is written into in the course of the most recent reading operation performed if no erroneous character has been detected by the end of this reading operation.

Other features of the invention, and the way in which it is put into effect, will become apparent in the course of the following description when considered in conjunction with the accompanying drawings, which show:

FIG. 1, a general diagram of an improvement to a system for recognising printed characters which is formed by a device for repeat reading and its interconnections with other parts of the system according to the invention.

Figure 2:
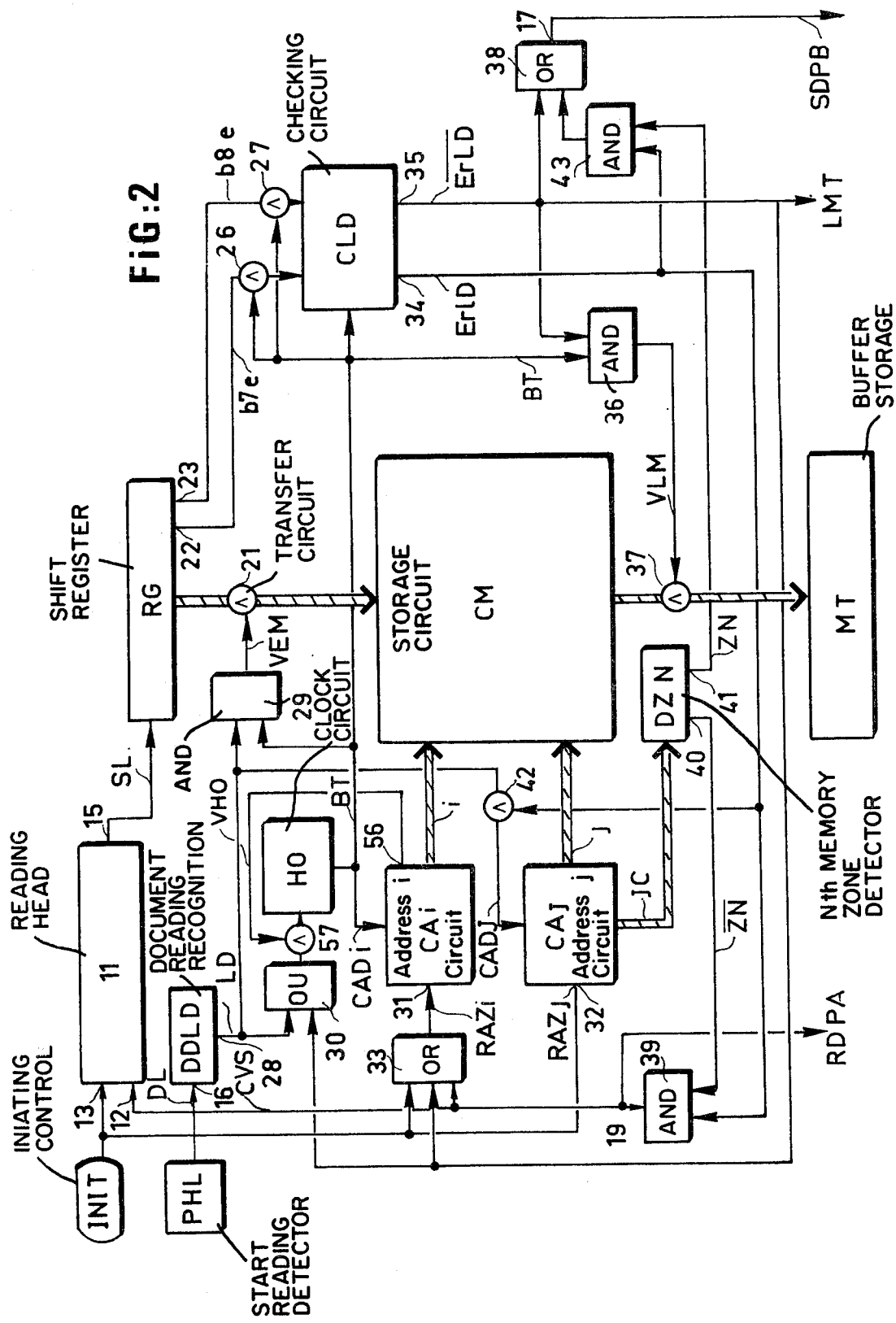
Figure 3:
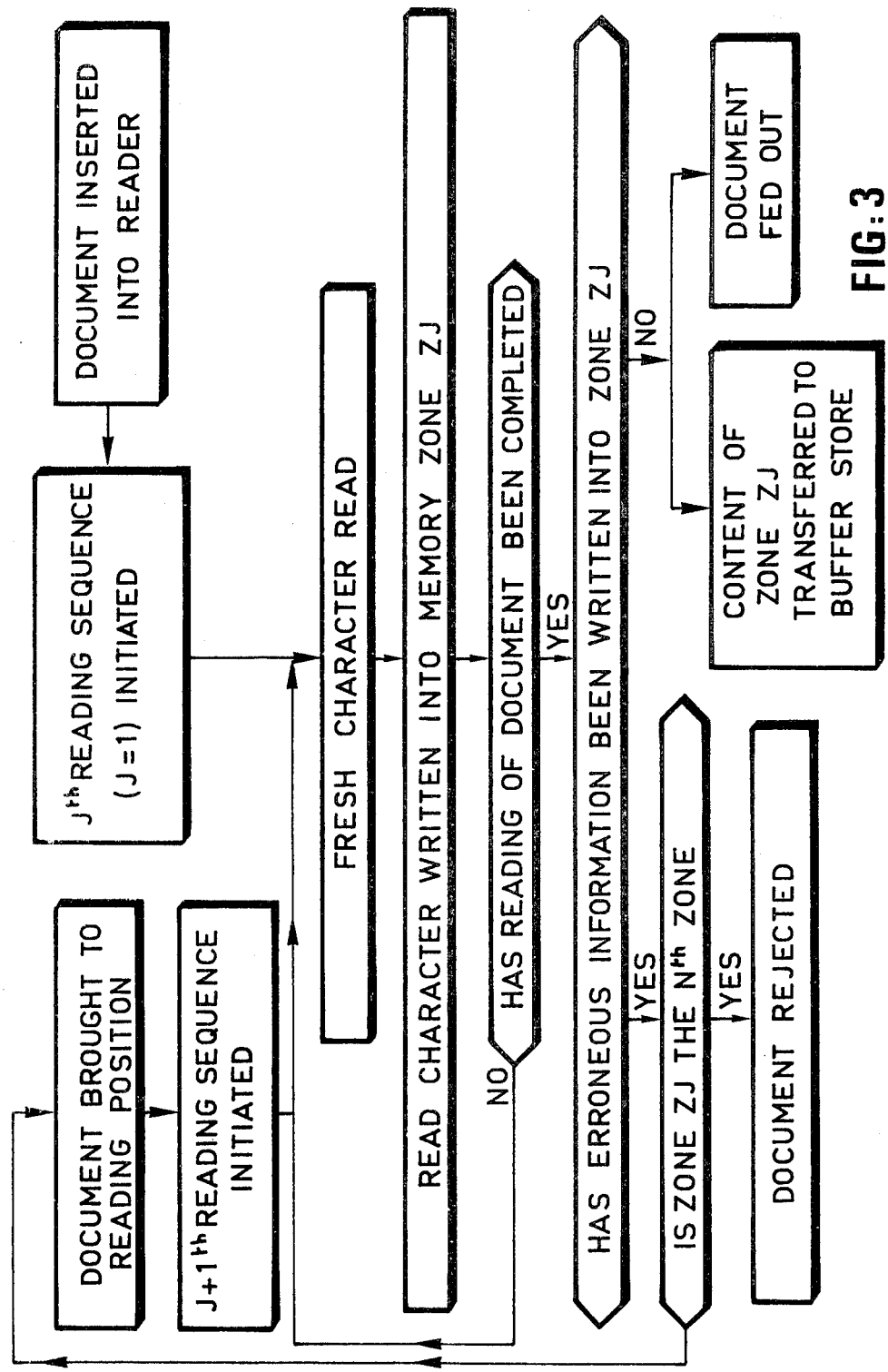
Figure 4:
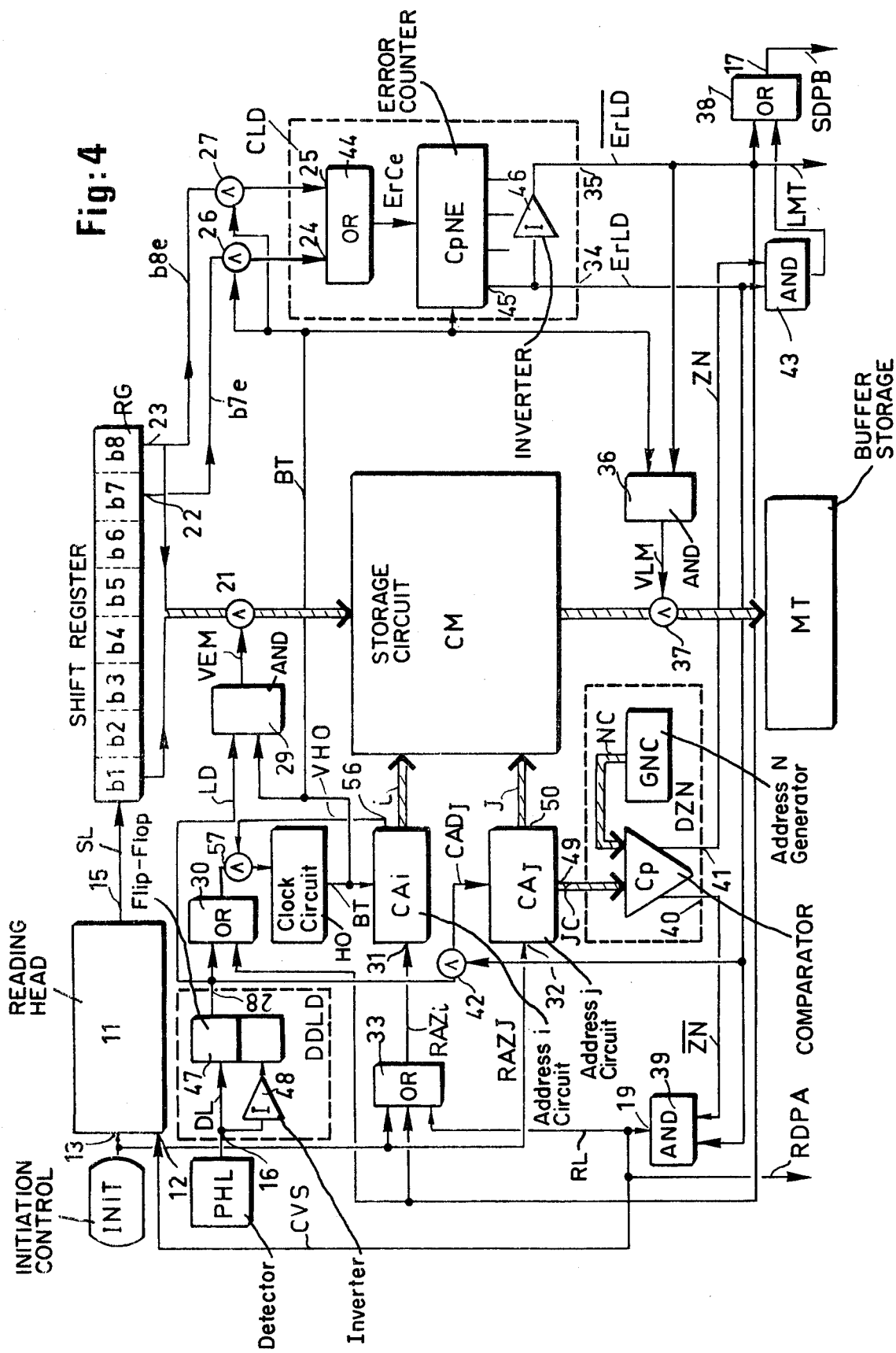
Figure 5:
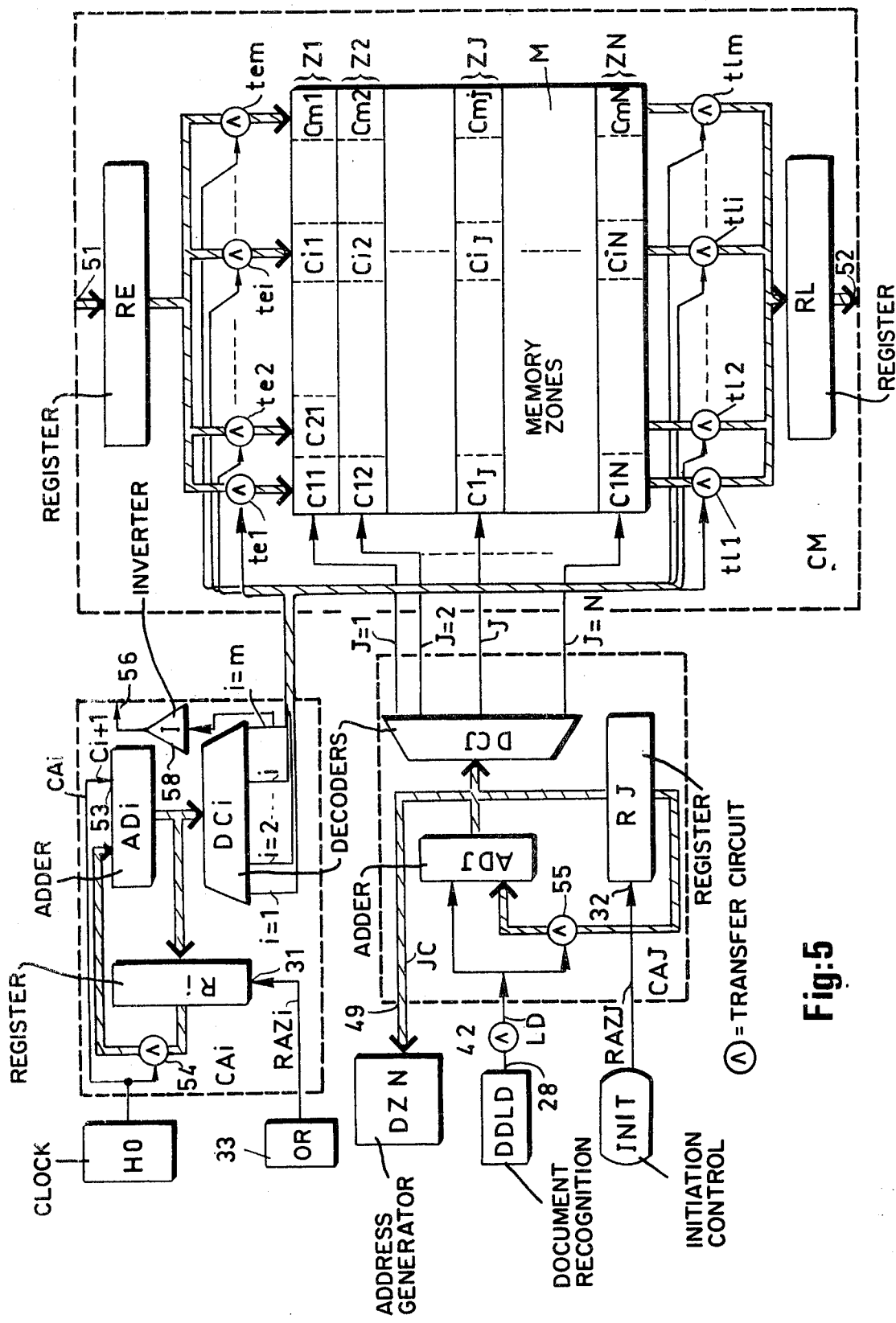

FIG. 2, a functional diagram of the repeat reading device of FIG. 1 which constitutes an improvement to a system for recognising printed characters according to the invention, FIG. 3 a flow chart of the main functions performed by the repeat reading device of FIG. 2, FIG. 4, a detailed diagram of the parts of the repeat reading device of FIGS. 1 and 2 by means of which this circuit is connected to the other parts of the system shown in FIG. 1, FIG. 5, a detailed diagram of a memory and its addressing circuits which is contained in the repeat reading device of FIGS. 1, 2 and 4.

In FIG. 1, an improvement to a character recognition system, according to the invention, is formed by a device DRL for repeating reading operations and its interconnections with the parts of the system, described in U.S. Pat. No. 4,042,807, corresponding to French application no. 74.40830 which was filed by the present applicants on Dec. 11, 1974. In FIG. 1, these parts include a mechanism for transporting documents along a track 10 situated between two stations A and B. Station A is used for inserting the document into the system to enable it to be processed therein and station B allows it to be extracted when the processing has been completed. A device 11 positioned above the track 10 along the path of the document between the two stations, enables the characters printed on the document to be read one by one as it moves along the track. For each character read, the device 11 generates a series of signals forming an item of binary coded information resulting from reading the character concerned, with which are associated signals forming an error code which result from a check which is made by device 11 on the binary-coded information obtained. In a preferred embodiment, each character is formed by seven lines which are arranged relative to one another in accordance with a so called "two out of six" code, that is to say the spaces between them comprise two long intervals and four short intervals. The reading of such a character, if correctly carried out, produces information coded on six bits, each 0 or 1 bit being associated with a short or long interval respectively which is read by the device 11 between the leading (or trailing) edges of two lines situated next to one another. By known means which are described in French Pat. No. 1,295,497 for example, the device 11 carries out a check on the character read which enables it to generate a two-bit error code for example, by checking the total number of intervals (or lines) in the character, that the items of information coded on the six bits are the same when the long and short intervals are measured from trailing edges and leading edges respectively, and that the read character, which should normally contain two long intervals and four short intervals, is a probable one. The error code generated by device 11 is, for example, such that a 00 combination of the two bits represents a good character, a 10 combination of the two bits represents a read character containing a number of lines less than seven, a 01 combination of the two bits means a read character containing at least eight lines, and a 11 combination represents either the fact that the results differ when reading is carried out from the leading and trailing edges respectively of the lines, or a read character which is improbable because the number of long intervals in it is other than two.

When the document being moved along track 10 is in the reading position beneath device 11, a detector PHL shown in FIG. 1 emits a signal DL indicating the commencement of reading. A device CA connected to the transporter mechanism enables the track 10 to be controlled to cause it to move from station A towards station B or vice versa. Thus, a document inserted at station A may be moved towards station B and then returned to station A by a command from device CA. Two triggering members DM1 and DM2 allow energising signals to be generated which, via a switching control circuit MC1, bring the control circuit CA into operation to cause the mechanism for transporting the document to move respectively from station A to station B and vice versa. When the detector PHL gives the signal DL for the beginning of the reading of the document, this signal is transmitted to circuit CA via switching circuit MC1 so as to trigger a step-by-step advance of the document under the reading device at a rate commensurate with an operating cycle of the device, in which the characters are read one by one. Means incorporated in device 11, which are not shown in FIG. 1, are designed to vary the threshold level applied to an amplitude discriminating circuit, such as that which is described in U.S. Pat. No. 3,286,233, corresponding to French Pat. No. 1,375,037 for example, by varying the characteristic impedance of the circuit which amplifies the read-out signal. In accordance with the invention, this impedance will be varied from a mean level which allows a reference character, that is to say one whose inking density is known, to be read. Starting from this initial value, each time device DRL emits a signal CVS to bring about a change in threshold, the value of the said impedance will be altered to a new one of N given values. A series of CVS signals emitted by device DRL cause the value of the impedance to be changed, in a pre-established order, each time the reading operation is repeated in such a way that the value is altered when the document is again in the reading position under device 11, that is to say when the detector PHL emits a fresh signal DL. The change in the threshold level may then be brought about by fresh action by an operator on the impedance or by any other known automatic means which are triggered by the signals CVS transmitted to input 12 of device 11.

The document to be processed having been inserted at station A and set in motion along the track towards station B by a command which may be given by a simple push-button INIT, the device 11 and the read-repeat device DRL are initialised by their respective inputs 13 and 14. When the device 11 sees past the first line in the first character to be read on the document, it begins to read the character and at its output 15 connected to device DRL generates successively a series of read-out signals SL which form an eight bit code which represents each character read and its associated error code. Each series of signals is separated from the next by a longer signal than the preceding ones, which is emitted from output 15 for a period corresponding to the very long interval which separates two successive characters on the document. The first signal which is transmitted from output 15 to device DRL is preceded by the signal DL which is transmitted by the detector PHL to input 16 of device DRL. If, after a document has been read by device 11, none of the various error codes transmitted to device DRL show an error to have been detected, the latter emits from its output 17 a control signal SDPB for station B, where the document is fed out. From output 18 of device DRL, a signal LMT is transmitted to a buffer store MT connected to device DRL to enable it to store all the six-bit codes (representing the various characters read on the document) which have successively been transferred from device DRL. If on the other hand at least one error is detected by device DRL from one of the various error codes associated with the characters read on the document by device 11, a signal RDPA is emitted from output 19 of device DRL, via an OR gate which receives either a signal emitted by trigger member DM2 or signal RDPA, at respective ones of its two inputs. Switching circuit MC1 transmits to circuit CA an order to move the document along the track from station B to station A, which order is manifested by an output from the OR gate and given either by an operator or by the device DRL, so that the document can be read again.

In FIG. 2, the reading device DRL from FIG. 1 includes a shift register RG by which it is connected to output 15 of device 11. This register is of the series-input/parallel-output type and has eight information storing locations for the temporary storage of the six bits of coded information representing a read character and the two bits $b7e$ and $b8e$ of the associated error code. A storage circuit CM is connected to the parallel outputs of register RG via a transfer circuit 21 which is formed by a set of AND gates which will be described subsequently. Register RG has two (22 and 23) of its parallel outputs connected to two inputs (24 and 25 respectively) of a circuit CLD for checking the reading of the document, to allow the bits $b7e$ and $b8e$ of each error code to be transmitted to it via two transfer circuits 26 and 27. The memory circuit CM is addressed by two circuits CA$i$ and CA$j$ in the respective cases where the items of information which are stored one by one in register RG each time the document is read are to be written into one of the N memory zones contained in circuit CM, and where the information written into one of the N zones is to be read out for transfer to buffer register MT. Circuit CA$i$ is designed to enable the items of information stored in register RG in the course of one of the operations of reading the document (which are equal at most to the given number N) to be written into and read out from various respective addresses designated "$i$" ("$i$" may vary between the value 1 and a whole number value $m$) in any one of the N memory zones. Circuit CA$j$ is designed to enable the items of information which are stored in register RG in the course of any operation of reading the document to be written into or read out from one of the N memory zones, the serial address number of the zone being the serial number of the reading operation which has just been performed on the document. A circuit DDLD, by which input 16 of device DRL is connected to detector PHL, is designed to emit from its output 28 a signal LD that the document is being read when signal DL is present at its input, that is to say during the whole of the step by step progress of the document beneath reading device 11. A clock circuit HO in device DRL is designed to emit clock signals BT of a given basic frequency which decides the operating cycle of circuit CA$i$ and circuit CLD, to both of which circuit HO is connected. Circuit HO also enables on the one hand transfer circuits 26 and 27 and on the other hand transfer circuit 21 to be validated via a AND gate 29 which emits a signal DEM for validating writing into the memory, which is transmitted to circuit 21, when it receives at its two inputs the signal LD from output 28 of circuit DDLD and the clock signal BT emitted by circuit HO respectively. An OR gate 30, of which one of its two inputs is connected to output 28 of circuit DDLD, causes the clock circuit HO to be put into operation by generating a signal at its output when signal LD is present at its input. At the same time as the reading device is initialised by operating the press button, circuits CA$i$ and CA$j$ are reset to zero by signals RAZ$i$ and RAZ$j$ respectively which are applied to two inputs 31 and 32. The signals RAZ$j$ and RAZ$i$ result from operating the press button INIT, which is connected on the one hand directly to input 32 of circuit CA$j$ and on the other hand (at the connection between circuit INIT and input 14 of device DRL shown in FIG. 1) via an OR gate 33 to input 31 of circuit CA$i$. Circuit CLD is designed to check the error code (given by bits $b7e$ and $b8e$) which arrives from register RG each time a clock pulse BT is emitted by circuit HO. Since circuit HO is validated during the whole time the document is being read by the signal LD transmitted by gate 30, it follows that during the same interval of time a series of pulses BT are transmitted to circuit CLD, which thus checks all the error codes associated with all the characters read from the document. If at least one error is detected by circuit CLD in the set of error codes, it generates from its output 34 a signal E$r$LD for an error in the reading of the document. If on the other hand no error is detected, circuit CLD generates from an output 35 a signal $\overline{ErLD}$ indicating no errors in the reading of the document. In this latter case, since signal LD is absent from output 28 of circuit DDLD (because the most recent operation of reading the document has been completed) gate 30 causes circuit HO to be operated again in response to receipt at a second input of the signal $\overline{ErLD}$ emitted from output 35 of circuit CLD, thus validating circuit CA$i$ to operate in accordance with a base cycle set by circuit HO, circuit CA$i$ being reset to zero by the same signal $\overline{ErLD}$ when transmitted to a second input of OR gate 33. Thus, when no error has been detected by the end of a reading operation, the various items of information read from the document and their associated error codes, which have just been written into a zone determined by circuit CA$j$, are read out from this memory zone of circuit CM by addressing its various "$i$" addresses, which is done by circuit CA$i$. An AND gate 36, of which one input is connected to output 35 of circuit CLD and another input is connected to the output of circuit HO generates, when signals $\overline{ErLD}$ and BT are present, a signal VLM from its output connected to a transfer circuit 37, thus validating the transfer of the items of information and their associated error codes to the buffer store MT. The transfer to the buffer store MT continues as long as the "$i$" address at the output of circuit CA$i$ is less than a given maximum value "$m$". Only in cases when "$i$" is different from $m$, a signal VHO is generated from an output 56 of circuit CA$i$ which is connected to a transfer circuit 57. Circuit 57, which is connected between gate 30 and circuit HO, causes clock circuit HO to be set into operation only when signal VHO is present. When the "$i$" address is equal to $m$, the clock circuit HO is stopped as a result of the absence of signal VHO. Also, the same signal E$r$LD, when transmitted to an input of an OR gate 38, enables device DRL to generate from its output 17 (i.e. the output of gate 38) the signal SDPB which allows station B to eject the document. The transfer of the data which has been written into a memory zone in circuit CM and the outfeed of the document from station B are brought about by device DRL either at the end of a first reading operation performed with an average threshold level, when the characters on the document have been recognised as satisfactory by circuit CLD, or subsequently at the conclusion of one of the (N-1) reading operations (other than the first) after at least one repeat read carried out by device DRL. Each repeat read results from the presence of a signal E$r$LD at output 34 of circuit CLD. In this case, signal E$r$LD is transmitted to an input of an AND gate 39 whose other input is connected to an output 40 of a circuit DZN. Circuit DZN is designed to detect whether the $j^{th}$ zone, in which the items of information resulting from the most recent reading operation and the associated error codes have been recorded, is the N$^{th}$ memory zone, and to generate a signal $\overline{ZN}$ (meaning the value of J is not equal to N) from its output 40 and a signal ZN (meaning the value of J is equal to N, i.e. zone ZJ = ZN) from a second output 41. If the most recent reading operation performed is not the N$^{th}$ reading operation, signal $\overline{ZN}$ is transmitted to gate 39 which, since it also receives signal E$r$LD, generates from its output 19 a signal which causes the document to be read again. This re-reading is brought about by a signal RL, which is transmitted on the one hand to a third input of OR gate 33 to enable circuit CA$i$ to to be reset to zero by signal RAZ$i$ and on the other hand to one of the inputs of the OR gate in FIG. 1 to act as the signal RDPA which enables the order for the document to be returned to station A to be generated from the output of circuit MC1. By means of the same signal generated from the output of gate 39 (referred to as signal CVS in FIG. 1) an order to change the threshold level is transmitted to input 12 of device 11 and this triggers a new reading operation as soon as the document arrives under the reading device after having been returned to station A and advanced along the track under the control of the triggering circuit DM1 in FIG. 1. A new reading operation having been initiated, the various items of information read from the document, and their associated error codes, are stored at the various "$i$" addresses in a fresh memory zone Z$j$. This new zone Z$j$ is addressed by means of circuit CA$j$, which emits the address $j$ from its output connected to memory circuit CM when it receives a signal CAD$j$ from output 28 of circuit DDLD via a transfer circuit 42 which is validated by the signal E$r$LD from output 34 of circuit CLD. If at the conclusion of an N$^{th}$ reading of the document circuit CLD has detected at least one error, an order SDPB (for the outfeed of the document from station B) is emitted from output 17 of gate 38, via an AND gate 43 which receives at one input the signal E$r$LD and at another input the signal ZN emitted from output 41 of circuit DZN. If the N reading operations so carried out have not allowed satisfactory characters to be stored in any of the memory zones the document is therefore expelled from station B and no use is made of the characters which have been read. By known means which are outside the scope of the present invention the contents of the memory are then erased.

FIG. 3, which shows how the various functions performed by device DRL are organised and enables a better understanding to be gained of the way in which the device, as shown in FIG. 2, operates. The document is inserted into the reader, i.e. station A, of the assembly formed by the combination of the transport mechanism and the device 11. By means of press button INIT, a $j^{th}$ read-reading sequence is initiated, $j$ being equal to 1 and the threshold level being at the said average value. In the operating cycle defined by the clock signals BT generated by circuit HO the characters printed on the document commence to be read one by one and begin to be recorded in register RG and then in a memory zone in circuit CM. During the first sequence, each character read is written into a zone $ZJ = Z1$, that is to say the first zone addressed by circuit CAJ, at the various "$i$" addresses indicated by circuit CA$i$. When a character read is the last character on the document being read, the fact that the reading of the document is at an end is indicated by detector PHL which ceases to emit signal DL. When this is the case, circuit CLD indicates whether at least one error has been detected in the course of writing the items of information read from the document into zone $ZJ = Z1$. If no error has been detected by circuit CLD, the document is fed out from station B and the content of zone $ZJ = Z1$ is transferred to the buffer store by means of transfer circuit 37 in FIG. 2. If at least one error has been detected by the end of the first reading, the document is returned to the reading position by the means described above and a second reading sequence is initiated with the threshold level set to a second value. A similar cycle takes place, involving reading the characters one by one and writing them into a second memory zone Z2. At the end of this second reading operation, a fresh check, performed by circuit CLD, enables a decision to be made either to use the items of information stored in zone Z2 if they are satisfactory, or to repeat the reading operation again if at least one of them is erroneous.

In general terms, as indicated in FIG. 3, when a $j^{th}$ sequence has been initiated, it is followed by the information read from the document being written into a $j^{th}$ memory zone Z$j$. At the end of the $j^{th}$ reading operation and the $j^{th}$ storage operation, circuit CLD allows it to be determined whether or not there is an erroneous item of information present in zone ZJ. IF there is an error and zone Z$j$ is other than zone ZN, a $j^{th}$ reading sequence is initiated with a new value for J which is obtained by making an increase of one unit, resulting in the information read being written into a zone $Z(J + 1)$. This re-reading cycle is repeated if an error occurs until the last zone ZN has been written into, in which case the document is definitely rejected with no use being made of the characters printed on it.

FIG. 4 is a detailed diagram of the device DRL from FIGS. 1 and 2 and more particularly of the circuits DDLD, CLD and DZN and of the organisation of register RG into eight storage locations $b1$, $b2$, $b3$, $b4$, $b5$, $b6$, $b7$, $b8$. In each character reading sequence (performed by device 11), which is defined by the length of time separating the detection of two very long intervals enclosing the character, a series of read-out signals SL is transmitted to register RG. At the end of the character reading sequence, the eight locations of register RG have each been loaded with an item of binary information which may be either 1 or 0. Locations $b7$ and $b8$ in particular are normally loaded with the bits $b7e$ and $b8e$ of the error code associated with the character. As a result of the circuits 26 and 27 in FIG. 2 being validated by the clock signal BT, and bits $b7e$ and $b8e$ are transmitted to the two inputs 24 and 25 of circuit CLD, that is to say to the inputs of an OR gate 44 belonging to this circuit. In accordance with the error code values specified above for a preferred embodiment, if the bits $b7e$ and $b8e$ are 0's (that is to say if there is no error in the character read) no signal is generated from the input of OR gate 44. If on the other hand an error is detected by device 11, at least one of the two bits $b7e$ and $b8e$ will be a 1 and because of this an error signal E$r$Ce is generated from the output of gate 44, indicating that the character which has been written into store is erroneous. By means of a counter C$p$NE contained in circuit CLD, the operation of which is timed by clock signal BT, the number of errors detected in the course of reading the document is established in the form of the number of signals E$r$Ce which are transmitted to the counter during the document reading sequence in question. For the error signal E$r$LD to be generated at output 34 of circuit CLD, it is merely necessary for the first output 45 of counter C$p$NE to be connected to output 34, a signal from output 45 corresponding to the first error signal E$r$Ce counted by circuit C$p$NE. If there is no signal from output 45 of counter C$p$NE, an inverter 46 whose input is connected to output 45 allows the signal E$r$LD, which indicates that no error has been detected in the course of reading the document, to be generated at its output, which is connected to output 35 of circuit CLD. In FIG. 4, circuit DDLD includes a flip-flop 47 of which a first input is connected to input 16 to receive the signal DL emitted by detector PHL, the second input of flip-flop 47 being likewise connected to input 16 but via an inverter 48 which transmits to it the inverted signal $\overline{DL}$. At the first output of flip-flop 47, which is connected to output 28 of circuit DDLD, the signal LD which is emitted when the detector emits signal DL ceases to be transmitted when the reading of the document is at the end. The signal DL which is then transmitted to the second input of flip-flop 47 causes the flip-flop to change state. In a preferred embodiment, circuit DZN is connected, as shown in FIG. 4, to outputs 49 of circuit CAJ, the other outputs 50 of which are connected to circuit CM. From outputs 49 of circuit CAJ are transmitted each combination of signals which represent an address $j$ in its binary coded form JC, whilst from outputs 50 are successively transmitted the various signals respectively corresponding to the N different values of $j$ by means shown in FIG. 5. Circuit DZN includes a comparator C$p$ which is connected by a first group of inputs to outputs 49 of circuit CA$j$ and by a second group of inputs to a generator GNC which generates signals representing the address N in its binary coded form NC, generator GNC being similarly included in circuit DZN. From a first output of comparator C$p$, which is connected to output 40 of circuit DZN, signal $\overline{ZN}$ is emitted when the zone concerned has an address J different from address N, that is to say when the coded addresses JC and NC are different. From a second output of comparator CP, which is connected to output 41 of circuit DZN, signal ZN is emitted when the zone concerned has an address $j$ the same as address N, that is to say when the coded addresses JC and NC are the same.

FIG. 5 is a detailed diagram of circuits CA$i$, CA$j$ and CM. Circuit CM contains a memory which has N zones which are addressable by circuit CA$j$, four of which Z1, Z2, ZJ, ZN are shown in FIG. 5. Each memory zone contains a given number $m$ of storage locations which are addressable by circuit CA$i$. The various items of information read from the document and associated error codes, which are both written into the memory, may at most be equal in each zone to "$m$" in each reading operation which is performed. Thus, in the first reading operation, $m$ items of data may be written into the first zone Z1, certain of which are written at their allotted places in the storage locations C11, C21, C$i$1, C$m$1 shown in FIG. 5. Items of data may also be written in particular into locations C12, C$i$2, C$m$2 in the second zone Z2 locations C1J, C$i$J, C$m$J in the $j^{th}$ zone ZJ and locations C1N, C$i$N, C$m$N in the $n^{th}$ zone ZN respectively in the course of the second reading operation, the $j^{th}$ reading operation, and the $n^{th}$ reading operation. Each binary combination stored in register RG is transferred, by circuit 21 of FIGS. 2 and 4, to an eight location register RE in circuit CM, via an input 51. The combination stored in register RE is then written into memory M by means of circuits CA$i$ and CA$j$. By a signal emitted from one of its outputs, circuit CA$i$ validates one of $m$ transfer circuits of which circuits $t$e1, $t$e2, $t$e$i$, $t$e$m$ are shown in FIG. 5. By means of a signal emitted from one of the outputs 50 of FIG. 4, circuit CA$j$ validates one of the zones, of which Z1, Z2, ZJ, ZN are shown in FIG. 5, by means of transfer circuits (not shown) similar to circuits $t$e1, $t$e2, $t$e$i$, $t$e$m$. Once one of the said zones has been validated by a signal from one of the outputs 50 of circuit CA$j$, it is possible to write an item of data into store at the address indicated by the circuit which validates the corresponding transfer circuit. Thus, an item of data is for example written into the location C$i$J corresponding to the $i^{th}$ address in the $j^{th}$ memory zone ZJ via circuit $t$e$i$. Once a zone has been validated by circuit CA$j$, it is likewise possible to read an item of data from store from the address indicated by circuit CA$i$, which validates an appropriate transfer circuit in the set of $m$ transfer circuits located at the memory output, of which circuits $t$11, $t$12, $t$1$i$ and $t$1$m$ are shown in FIG. 5. Each item of data read from store, which is represented by a binary combination, is loaded into a register RL which is connected to the various circuits of which circuits $t$11, $t$12, $t$1$i$ and $t$1$m$ are shown in FIG. 5. The transfer of the item of read-out data to the buffer store shown in FIGS. 1, 2 and 4 takes place via output 52 of circuit CM, which is connected to circuit 37. Circuit CA$i$ includes an adder AD$i$ which adds one unit each time its receives at an input 53 a clock signal (indicated as C$i$ + 1 in FIG. 5) from circuit HO. The addition is made to a binary combination which comes, from a register R$i$ contained in circuit CA$i$, via a transfer circuit 54. The result of each addition which is made is transmitted from output 55 of adder AD$i$ on the one hand to the input of register R$i$ and on the other hand to the inputs of a decoder DC$i$ in circuit CA$i$.

The gate 33 which is connected to input 31 of circuit CA$i$ (which is input 31 of register R$i$ in FIG. 5) allows the signal RAZ$i$ for resetting register R$i$ to zero to be emitted either when device DRL is initialised, or when there is no error, indicated by signal $\overline{ErLD}$, or when there is an error, indicated by signal ErLD. Since decoder DC$i$ has $m$ outputs, when the device is initialised, register R$i$ is reset to zero and a combination of 0 bits is transmitted to adder AD$i$ in response to a first clock signal as the document begins to be read. Since this combination is increased by one binary unit by the adder AD$i$ at the output of the register, a first coded "$i$" address is transmitted to decoder DC$i$ and is also loaded into register R$i$. The decoding of this first "$i$" address by circuit DC$i$ enables DC$i$ to generate from the first one of its outputs a signal corresponding to the address $i = 1$. In FIG. 5 are shown the outputs $i = 1$, $i = 2$, $i$ and, $i = m$ of the decoder which are respectively connected to circuits $t$e1, $t$e2, $t$e$i$, $t$e$m$ and circuits $t$11, $t$12, $t$1$i$, $t$1$m$. In the course of a cycle of writing into a memory zone, the various items of data loaded into register RG are successively written at the various addresses in the said zone, in the order 1 to $m$, in response to the succession of signals emitted from the outputs of decoder DC$i$. Signal $\overline{ErLD}$ initiates a read-out sequence from the memory and resets register R$i$ to zero. Circuit CA$i$ then, successively emits from its various outputs, in the order 1 to $m$, signals for the items of data to be read out from that zone as indicated by circuit CAJ, in which the items of data read during the most recent reading operation performed by device 11 have just been written. Signal E$r$LD initiates a new sequence of writing into memory. Circuit CA$i$ successively emits from its various outputs, in the order 1 to $m$, signals from the items of data read from the document to be written into the next zone as determined by CAJ. Circuit CA$i$ also includes an inverter 58 connected to the output $i = m$ of decoder DC$i$. The output of inverter 58 causes the signal VHO to be emitted from output 56 of circuit CA$i$ as long as the "$i$" address at the output of decoder DC$i$ is different. Circuit CA$j$ includes members which are identical to those in circuit CA$i$, namely an adder ADJ, a register RJ, a decoder DCJ and a transfer circuit 55. The adder ADJ is responsible for the addition of one unit each time it receives a signal MD from circuit DDLD via circuit 42 of FIGS. 2, 4 and 5, that is to say each time the document is reread. Register RJ, when reset to zero by the signal RAZJ which is transmitted to input 32 of circuit CAJ (which is an input of register RJ in FIG. 5), transmits a first combination of 0 bits to adder ADJ, via circuit 55 which is validated by a first signal LD transmitted by circuit 42. The first binary coded address calculated by adder ADJ is transmitted to circuit DZN via output 49 of circuit CAJ, to register RJ, and to decoder DCJ, which decodes it in order to generate at the first of its outputs 50 in FIG. 4 a signal which validates the first zone Z1. As long as the same signal LD is being transmitted to circuit CA$j$, the latter emits the signal J = 1 to validate the zone Z1. FIG. 5 shows three other outputs J = 2, J, J = N of decoder DCJ, from which signals are emitted if, respectively, a second, a J$^{th}$, and an N$^{th}$ reading operations are performed in succession by device 11. At each new reading operation, the previous J address is increased by one unit by a fresh signal LD. In this way a transition is made for example from the first to the second zone, and the signal formerly emitted from output J = 1 is followed by a signal from output J = 2. It should be noted that in the embodiments of circuits CA$i$, CA$j$ and C$m$, which have been described in the form shown in FIG. 5, the values N and $m$ are determined in advance. These values are decided as a function of the type of document being handled, the circuits' maximum capacity for printed characters and on the basis of statistical data, used in selecting the number N, which provides an estimate of the number of faults which can reasonably be expected, that is to say the maximum number of reading operations needed to eliminate possible ambiguities in the interpretation of the results of reading. As an example, when the invention is applied to the handling of cheques, satisfactory results are obtained when N is as low as three.

The embodiment of the invention which is described in the foregoing description is in no way limiting. The number N = 3 is given as an illustration applicable to one possible use of the invention. Depending upon the standard of the printing and the quality of the paper, it may be necessary to adopt a number N greater than 3, whilst not allowing it to exceed limits compatible with the desired performance in terms of the time available for reading, and with the cost of the system for recognising printed characters which is provided in the overall system which handles the data.

I claim:

1. In a system for recognizing printed characters including a reading device having at least one amplitude discriminating circuit adapted to have various threshold levels applied to it, the threshold level being adjusted when a document is read for the first time to a first average value which is set to allow a reference character whose mean inking is known to be recognized, means connected to the reading device for generating, for each character read, items of binary coded information and an associated binary-coded error code obtained by checking the corresponding items of coded information, means for locating the point at which the reading of the document commences, reading means associated with the reading device for reading the document and being adapted to generate a read signal during the whole period when the document is being read, and a buffer store connected to said reading means for temporary storage of read characters which are satisfactory for use, the improvement comprising means for repeat reading, said repeat reading means being connected to said reading means and to the buffer store and said repeat reading means including storage means having a plurality of memory zones for storing items of information and associated error codes resulting from the first reading operation one by one in a first memory zone and storing items of information and associated error codes resulting from each subsequent reading operation in different memory zones as long as at least one erroneous character is detected in the course of a reading operation, means to check whether an examination of all the error codes stored in the first zone does not result in at least one character being recognized as erroneous; and means for generating a central signal applied to said reading means to initiate a repeat of the operation of reading the document with the threshold at different respective values which are respectively ascending and descending on one or the other side of the first value; the total number of reading operations with the threshold applied to the reading device at different levels not exceeding a given number N, and means to read and transfer to the buffer store the content of a memory zone which is written into in the course of the most recent reading operation performed, if no erroneous character has been detected by the end of its reading operation.

2. A system for recognizing printed characters according to claim 1 including a transport mechanism having an input station and an output station, each printed character being composed of a predetermined number of vertical lines arranged in accordance with a given code, said reading means including means for reading the characters serially as a result of the document being moved between an input station and an output station of a transport mechanism associated with the reading device, initiating circuit means for initiating the first operation of reading the document in response to an initiating signal transmitted to the reading device, said storage means including a memory circuit having N memory zones connected by a group of inputs to the reading device and by a group of outputs to the buffer store, first and second addressing circuits arranged to allow access to the various addresses in a zone and to the N different zones respectively, a clock circuit for generating from an output, during the whole of one operation of reading a document, a succession of clock signals in response to a signal emitted by said means for locating the point at which the document commences to be read, to which means said clock circuit is connected by an input, said means to check including circuit means for checking the reading of the document and generating an error signal at a first output and a signal for no error at a second output when, respectively, at least one erroneous code is detected in the course of one operation of reading the document in the set of error codes transmitted by the reading device to which the checking circuit is connected, and when there is no erroneous code, the first addressing circuit generating in succession, in response to the clock signals which are received from the clock circuit to which it is connected by an input, the various addresses in a zone to validate the writing at these addresses, in succession, of the items of information read and their associated error codes which are transmitted by the reading device to the group of inputs of the memory circuit, the second addressing circuit generating the address of that zone in which the writing is to take place in response to the signal emitted by the means for locating the point at which the document begins to be read, to which it is connected by an input, the first and the second addressing circuits having respective second inputs connected to the initiating circuit, the second input of the first addressing circuit being additionally connected to the first output of the checking circuit for as long as the address generated by the second addressing circuit is not that of the Nth zone.

3. In a system for recognizing printed characters according to claim 2, wherein the first addressing circuit includes an adder and a decoder for decoding addresses, calculated by said adder, said decoder having $m$ outputs to address respective ones of a given maximum number $m$ of addresses in each zone of the memory circuit, an $m$th output of the decoder being connected to a second inverter contained in the first addressing circuit, said second inverter generating from its output a signal to invalidate the operation of the clock circuit at the time when the $m$th address in a zone is reached when this zone is being written into or read from.

4. In a system for recognizing printed characters according to claim 2, wherein the means for generating a control signal includes a detector for detecting the Nth memory zone, said Nth memory zone being connected to a group of outputs of the second addressing circuit so as to emit a signal from a first output if the address generated by the second addressing circuit is not that of the Nth zone and to emit a signal from a second output if the said address is that of the Nth zone, first and second OR gates and first and second AND gates, the input of the clock circuit being connected to the means for locating the point at which the document begins to be read by an input of the first OR gate, of which another input is connected to the second output of the checking circuit, the first addressing circuit having its second input connected to the initiating circuit via a first input of the second OR gate, of which a second input is connected to the second output of the checking circuit, a third input of the second OR gate being connected to the first output of the checking circuit via an input of the first AND gate, of which another input is connected to the first output of the detector for detecting the Nth zone, the second AND gate having an input connected to the means for locating the point at which the document begins to be read and another input connected to the output of the clock circuit.

5. In a system for recognizing printed characters according to claim 4, wherein the first addressing circuit includes an adder and a decoder for decoding addresses which are calculated by an adder, said decoder having $m$ outputs to address respective ones of a given maximum number $m$ of addresses in each zone of the memory circuit, an $m$th output of the decoder being connected to a second inverter contained in the first addressing circuit, said second inverter generating from its output a signal to invalidate the operation of the clock circuit at the time when the $m$th address in a zone is reached when this zone is being written into or read from.

6. In a system for recognizing printed characters according to claim 4, wherein the means for generating a control signal also includes third and fourth AND gates and a third OR gate, the third AND gate having an input connected to the output of the clock circuit and another input connected to the second output of the checking circuit, the fourth AND gate having an input connected to the first output of the checking circuit and another input connected to the second output of the detector for detecting the Nth zone, the third OR gate having an input connected to the second output of the checking circuit and another input connected to the output of the fourth AND gate.

7. A system for recognizing printed characters according to claim 6, wherein the error code for each item of information read is a code consisting of two bits, said storage means including a shift register having at least two predetermined storage locations into which said two bits are loaded temporarily, said shift register having a series input connected to the group of inputs of the memory circuit, the checking circuit means including a fourth OR gate, a counter, and a first inverter, two inputs of the fourth OR gate being connected to the two storage locations of the shift register which successively contain the pairs of bits representing the error codes associated with the items of information read, the output of the fourth OR gate being connected to an input of the counter, said counter being arranged to count all the signals emitted from the output of the fourth OR gate while clock signals received at a second input are present, the first output of the checking circuit being connected to a first output of the counter which is also connected to the second output of the checking circuit via the first inverter.

8. In a system for recognizing printed characters according to claim 6, wherein the first addressing circuit includes an adder and a decoder for decoding addresses which are calculated by an adder, said decoder having $m$ outputs to address respective ones of a given maximum number $m$ of addresses in each zone of the memory circuit, an $m$th output of the decoder being connected to a second inverter contained in the first addressing circuit, said second inverter generating from its output a signal to invalidate the operation of the clock circuit at the time when the $m$th address in a zone is reached when this zone is being written into or read from.

9. In a system for recognizing printed characters according to claim 4, wherein the error code for each item of information read is a code consisting of two bits, said storage means including a shift register having at least two predetermined storage locations into which said two bits are loaded temporarily, said shift register having a series input connected to the reading device and parallel outputs connected to the group of inputs of the memory circuit, the checking circuit means including a fourth OR gate, a counter, and a first inverter, two inputs of the fourth OR gate being connected to the two storage locations of the shift register which successively contain the pairs of bits representing the error codes associated with the items of information read, the output of the fourth OR gate being connected to an input of the counter, said counter being arranged to count all the signals emitted from the output of the fourth OR gate while clock signals received at a second input are present, the first output of the checking circuit being connected to a first output of the counter which is also connected to the second output of the checking circuit via the first inverter.

10. In a system for recognizing printed characters according to claim 2, wherein the error code for each item of information read is a code consisting of two bits, said storage means including a shift register having at least two predetermined storage locations into which said two bits are loaded temporarily, said shift register having a series input connected to the reading device and parallel outputs connected to the group of inputs of the memory circuit, the checking circuit means including a fourth OR gate, a counter, and a first inverter, two inputs of the fourth OR gate being connected to the two storage locations of the shift register which successively contain the pairs of bits representing the error codes associated with the items of information read, the output of the fourth OR gate being connected to an input of the counter, said counter being arranged to count all the signals emitted from the output of the fourth OR gate while clock signals received at a second input are present, the first output of the checking circuit being connected to a first output of the counter which is also connected to the second output of the checking circuit via the first inverter.

11. In a system for recognizing printed characters according to claim 10, wherein the first addressing circuit includes a decoder for decoding addresses which are calculated by an adder, said decoder having $m$ outputs to address respective ones of a given maximum number $m$ of addresses in each zone of the memory circuit, an $m$th output of the decoder being connected to a second inverter contained in a the first addressing circuit, said second inverter generating from its output a signal to invalidate the operation of the clock circuit at the time when the $m$th address in a zone is reached when this zone is being written into or read from.

* * * * *